United States Patent [19]

Yapp et al.

[11] 4,445,394

[45] May 1, 1984

[54] CONTROL LEVER ARRANGEMENTS

[75] Inventors: Robert E. Yapp, Chillington; Derek J. Smith, Curdworth, both of England

[73] Assignee: Massey-Ferguson Services N.V., Curacao, Netherlands Antilles

[21] Appl. No.: 297,886

[22] Filed: Aug. 31, 1981

[30] Foreign Application Priority Data

Sep. 6, 1980 [GB] United Kingdom ............... 8028849

[51] Int. Cl.³ .............................................. F16C 1/10
[52] U.S. Cl. ................................... 74/501 R; 74/475
[58] Field of Search ................. 74/501, 475, 473 R, 74/519, 527, 520, 100 R

[56] References Cited

U.S. PATENT DOCUMENTS

| | | | |
|---|---|---|---|
| 2,555,207 | 5/1951 | Trevaskis | 74/501 |
| 2,621,523 | 12/1952 | Taylor | 74/100 |
| 2,851,898 | 9/1958 | Hasty | 74/519 |
| 2,983,160 | 5/1961 | Hause | 74/527 |
| 3,490,309 | 1/1970 | Gustavson | 74/520 |
| 3,941,008 | 3/1976 | Cambria | 74/475 |
| 4,292,858 | 10/1981 | Lipsheild | 74/501 R |

Primary Examiner—Lawrence J. Staab
Assistant Examiner—Anthony W. Raskob, Jr.
Attorney, Agent, or Firm—John C. Thompson

[57] ABSTRACT

A control lever arrangement (10) for longitudinally moving an actuating member such as a Bowden cable (11) between first and second positions. The arrangement includes first (13) and second (14) mutually inclined cam slots and a control lever (15) which has a handle at one end and which is pivotally mounted (20) at the other end on a follower (16) for engagement with the first cam slot. The lever (15) carries guidance means (17) for engagement with the second cam slot and is connected (21) with the actuations member (11), so that, as the control lever is rotated (X1,X2) about its mounting (20) on the follower (16) to move the actuating member between its first and second positions, the follower moves along the first (13) cam slot as the guidance means (17) moves along the second cam slot (14) and the point of contact of the follower (16) with the first slot (13) moves across the line of action (33) of the actuating member (11) so that the lever goes over-center.

2 Claims, 5 Drawing Figures

CONTROL LEVER ARRANGEMENTS

BACKGROUND OF THE INVENTION

This invention relates to control lever arrangements and in particular to such arrangements in which the pivoting of a control lever causes longitudinal movement of an actuating member such as a Bowden cable or a rod.

It is an object of the present invention to provide an improved form of such a control lever arrangement which is both simple and efficient in operation.

SUMMARY OF THE INVENTION

Thus according to the present invention there is provided a control lever arrangement for longitudinally moving an actuating member between first and second positions, the arrangement comprising a cam means with first and second mutually inclined portions, a control lever having a handle portion at one end and pivotally mounted at the other end on a follower for engagement with the first portion of the cam means, the lever being operatively connected with the actuating member at a location intermediate the ends, and guidance means on the lever for engagement with the second portion of the cam means, the arrangement being such that as the control lever is rotated about its mounting on the follower to move the actuating member between the first and second positions the follower moves along the first portion of the cam means as the guidance means moves along the second portion and the point of contact of the follower with the first portion moves across the line of action of the actuating member so that the lever goes over-centre.

In a preferred arrangement the second portion of the cam means is aligned with the intended direction of longitudinally movement of the end portion of the actuating member which is operatively connected with the control lever.

The above arrangement ensures longitudinal movement of the end portion of the actuating member without the need for any bending. This is particularly important when the actuating member is a Bowden cable.

The cam means and guidance means may both comprise rollers and the actuating member may be connected with the control lever on the rotation axis of the guidance means roller.

Conveniently the first and second portions of the cam means comprise first and second slots formed in a lever support means.

Preferably the first portion of the cam means is shaped to ensure that as the lever moves across the line of action of the actuating member the follower is biassed away from this line of action so that the actuating member is held in either the first or second position depending on the direction of pivoting of the lever.

BRIEF DESCRIPTION OF THE DRAWINGS

One embodiment of the present invention will now be described with reference to the accompanying drawings in which.

DESCRIPTION OF A PREFERRED EMBODIMENT

Figure 1:
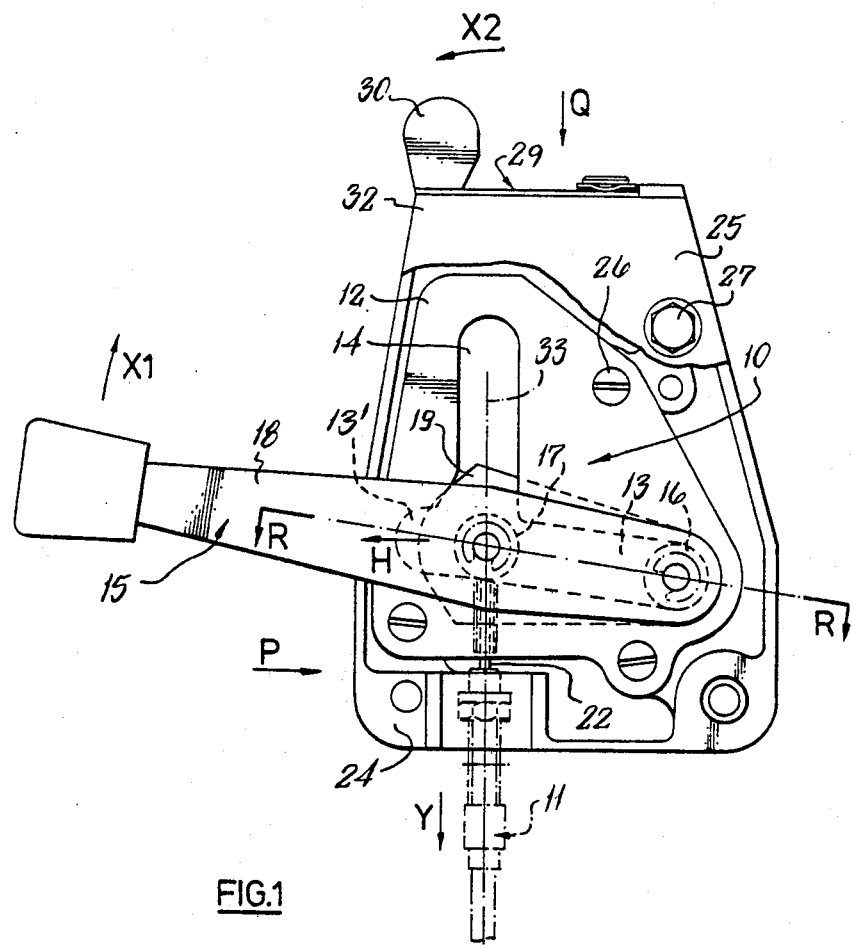
FIG. 1 is a side view, partly cut-away, of a control lever assembly embodying the present invention.
Figure 2:
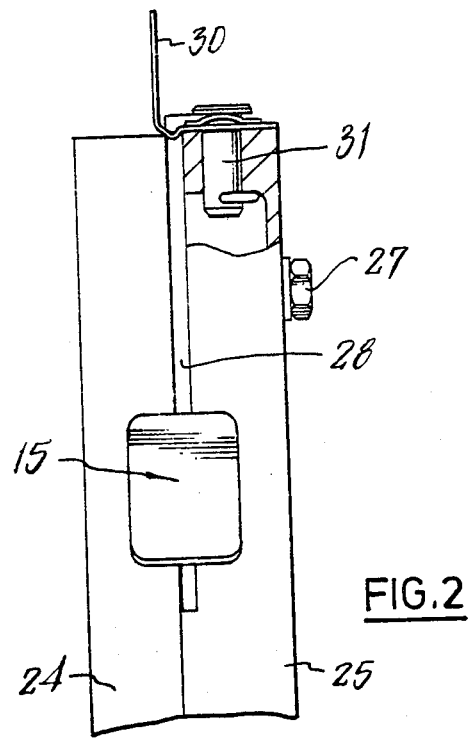
FIG. 2 is an end view in the direction of arrow P of FIG. 1.
Figure 3:
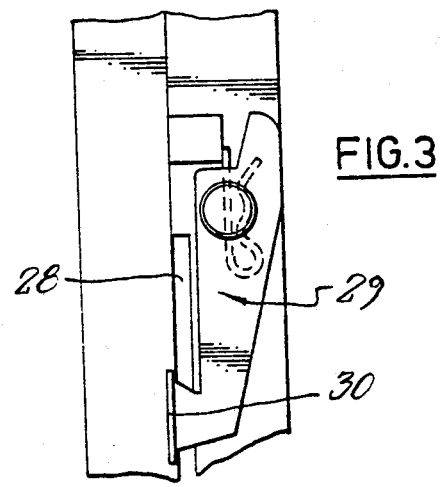
FIG. 3 is a plan view in the direction of arrow Q of FIG. 1.
Figure 4:
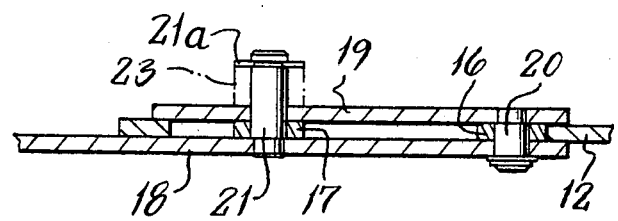
FIG. 4 is a section through the control lever and support plate of the assembly on the line R—R of FIG. 1.

Referring to the drawings, a control lever arrangement 10 for operating an actuating means in the form of a Bowden cable 11 comprises a lever support structure in the form of a plate 12 provided with cam means in the form of first and second mutually inclined and intersecting cam slots 13 and 14 respectively. A control lever 15 is pivotally mounted on the plate 12 via first and second rollers 16 and 17 which act as follower and guidance rollers respectively.

As can best be seen from FIG. 1 the lever 15 comprises a main plate component 18 and a shorter but wider backing plate 19. The rollers 16 and 17 are supported between plates 18 and 19 by pins 20 and 21 respectively. The inner cable 22 of Bowden cable 11 is connected with the lever 15 by a collar 23 which is mounted on pin 21 and retained in position by a spring clip 21a.

The support plate 12 is mounted between two parts 24 and 25 of a housing by screws 26 which secure the plate to housing part 24. Bolts 27 secure the two housing parts together, a slot 28 for the passage of the lever 15 being provided between the housing parts. A latch 29, having an operating tab 30 is pinned at 31 to the top of housing part 25 and extends across the top part of the slot 28.

With the lever 15 in the position shown in FIG. 1 the cable inner 22 is in its retracted condition. If the lever 15 is pivotted in a clockwise sense as indicated by arrow XI, roller 17 moves up the cam slot 14, and roller 16 moves to the left along cam slot 13. This pivoting of lever 15 extends the cable inner 22 against spring biassing (not shown) and since slot 14 is aligned with the inner 22 this extension occurs without any bending of the inner. As the lever reaches the corner 32 of the housing the latch 29 must be displaced sideways using tab 30 so that the lever 15 can enter the portion of the slot 28 in the top of the housing.

As the roller 17 reaches the upper portions of slot 14 the roller 16 crosses the line of action 33 of the cable inner so that the lever goes over-centre and the roller 16 enters portion 13' of slot 13.

Figure 5:
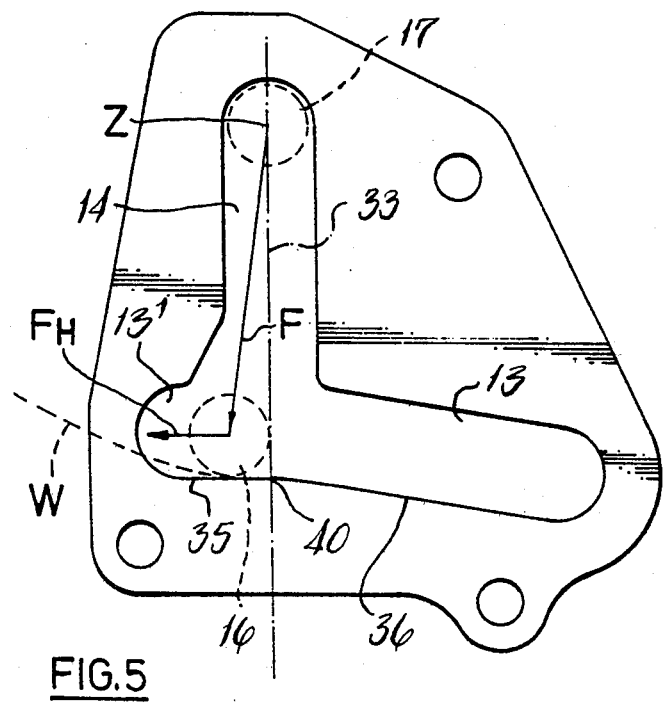
FIG. 5 shows the support plate in more detail.

The shape of the portion 13' of slot 13 is shown in greater detail in FIG. 5.

The spring biassing of the cable inner which acts in the direction of the arrow Y of FIG. 1 applies a force F to the surface 35 of slot portion 13' down the handle 15 via pin 21 and roller 16. Pin 21 is shown as centre Z in FIG. 5. Since surface 35 is generally perpendicular to the line of action 33, force F has a component FH in direction H which ensures that as the roller 16 crosses the line of action 33 it is biassed in direction H towards the left-hand end of slot portion 13'. Thus the lever is held in a stable over-centre position by the bias force applied to the cable inner. It will be appreciated that the lever will always be positively moved to the left-hand end of slot 13 by the bias acting on the cable inner providing that surface 35 extends from point 40 on the line of action 33 at locations lying outside an arc W drawn with centre Z.

To return the cable inner to its retracted condition the operator again moves the latch 29 from its position across the slot 28 and pivots the lever 15 in an anticlockwise sense as indicated by arrow X2 so that the roller 16 moves to the right in slot portion 13' towards the line of action 33. Once the roller has crossed the line of action 33 the spring loading on the cable inner 22 and the downward slope of surface 36 of slot 13 ensure that the lever returns to the position shown in FIG. 1 without further manual effort.

A further important advantage of the control lever assembly of the present invention is that as the lever 15 is pivotted upwards towards the vertical position during extension of the cable inner, so the mechanical advantage of the lever assembly is increased due to the toggle action of the assembly.

The present invention thus provides a simple and efficient pivoting control lever assembly which is capable of longitudinally moving an actuating member such as a cable or rod and which has application in many fields. For example the control lever assembly described is suitable for the operation of the selector valve 50 employed in the tractor hydraulic system described and claimed in the Applicants co-pending U.K. Patent Applications Nos. 8015317 and 8015319.

We claim:

1. A control lever arrangement for longitudinally moving an actuating member along a line of action between first and second positions, the arrangement comprising a cam means with first and second mutually inclined portions, a control lever operatively connected with the actuating member and pivotally moveable between first and second stable lever positions corresponding to the first and second positions respectively of the actuating member, the control lever having a handle portion at one end and being mounted for said pivotal movement via a follower which engages the first portion of the cam means and by a guidance means which engages the second portion of the cam means, the arrangement being such that as the lever is pivoted from its first to its second position to longitudinally displace the actuating member, the guidance means moves along the second portion of the cam means and the follower moves along the first portion of the cam means so that the point of contact of the follower with the first portion of the cam means moves towards the line of action of the actuating member whereby the mechanical advantage of the lever increases, the lever also going overcenter thus executing a toggle action between its first and second stable positions.

2. A control lever arrangement of longitudinally moving a biased actuating member along a line of action between first and second positions, the arrangement comprising a cam means with first and second mutually inclined portions, a control lever operatively connected with the actuating member and pivotally connected with the actuating member and pivotally moveable between first and second stable lever positions corresponding to the first and second positions respectively of the actuating member, the control lever having a handle portion at one end being mounted for said pivotal movement via a follower which engages the first portion of the cam means and by a guidance means which engages the second portion of the cam means, the arrangement being such that as the lever is pivoted from its first to its second position to longitudinally displace the biased actuating member, the guidance means moves along the second portion of the cam means and the follower moves along the first portion of the cam means so that the point of contact of the follower with the first portion of the cam means moves towards the line of action of the actuating member whereby the mechanical advantage of the lever increases, the lever also going overcenter thus executing a toggle action between its first and second stable lever positions and the first portion of the cam means being shaped to ensure that the follower is biased away from the overcenter position by the biased actuating member towards the first or second stable lever position depending on the direction of pivoting of the lever.

* * * * *